US009063934B2

(12) United States Patent
White

(10) Patent No.: US 9,063,934 B2
(45) Date of Patent: Jun. 23, 2015

(54) SYSTEM FOR IDENTIFYING MEDIA CONTENT

(75) Inventor: Scott White, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1394 days.

(21) Appl. No.: 11/840,455

(22) Filed: Aug. 17, 2007

(65) Prior Publication Data

US 2009/0049402 A1   Feb. 19, 2009

(51) Int. Cl.
  *G06F 3/00* (2006.01)
  *G06F 3/048* (2013.01)
  *G06F 17/30* (2006.01)
  *G06Q 20/12* (2012.01)

(52) U.S. Cl.
  CPC ........ *G06F 17/30035* (2013.01); *G06Q 20/123* (2013.01)

(58) Field of Classification Search
  CPC .............. G06F 3/00; G06F 3/048; G06F 3/16
  USPC ........................................... 715/721, 77, 776
  See application file for complete search history.

(56) References Cited

U.S. PATENT DOCUMENTS

| | | | | |
|---|---|---|---|---|
| 5,920,316 A * | 7/1999 | Oran et al. | ..................... | 715/779 |
| 6,509,908 B1 * | 1/2003 | Croy et al. | ..................... | 715/716 |
| 6,711,586 B1 * | 3/2004 | Wells | ...................................... | 1/1 |
| 7,395,507 B2 * | 7/2008 | Robarts et al. | ................. | 715/744 |
| 7,774,815 B1 * | 8/2010 | Allen | ............................... | 725/80 |
| 8,260,656 B1 * | 9/2012 | Harbick et al. | .............. | 705/7.31 |
| 8,560,398 B1 * | 10/2013 | Gregov et al. | ............... | 705/26.2 |
| 2002/0042923 A1 * | 4/2002 | Asmussen et al. | .............. | 725/92 |
| 2003/0066085 A1 * | 4/2003 | Boyer et al. | ................... | 725/104 |
| 2003/0093790 A1 * | 5/2003 | Logan et al. | ..................... | 725/38 |
| 2004/0196906 A1 * | 10/2004 | Gordon et al. | ........... | 375/240.12 |
| 2005/0015712 A1 | 1/2005 | Plastina et al. | | |
| 2005/0080670 A1 * | 4/2005 | Kehoe | ............................. | 705/14 |
| 2005/0251758 A1 * | 11/2005 | Cummins et al. | ............. | 715/838 |
| 2006/0088276 A1 | 4/2006 | Cho et al. | | |
| 2006/0136502 A1 | 6/2006 | Williams et al. | | |
| 2006/0149781 A1 | 7/2006 | Blankinship | | |
| 2006/0254409 A1 | 11/2006 | Withop | | |
| 2007/0250864 A1 * | 10/2007 | Diaz Perez | ....................... | 725/52 |
| 2008/0163307 A1 * | 7/2008 | Coburn et al. | ................... | 725/61 |
| 2008/0195620 A1 * | 8/2008 | Abanami et al. | .................. | 707/9 |
| 2008/0227384 A1 * | 9/2008 | Placzek et al. | ............... | 455/3.06 |
| 2008/0228689 A1 * | 9/2008 | Tewary et al. | .................. | 706/48 |
| 2010/0050211 A1 * | 2/2010 | Seldin et al. | ..................... | 725/46 |

* cited by examiner

*Primary Examiner* — Doon Chow
*Assistant Examiner* — Le Nguyen
(74) *Attorney, Agent, or Firm* — Guntin & Gust, PLC; Ralph Trementozzi

(57) ABSTRACT

A system that incorporates teachings of the present disclosure may include, for example, a media content processor having a controller element to compare a first portion of metadata associated with media content under presentation with a second portion of metadata of each of one or more media content sources to present one or more alternative sources of related media content. Other embodiments are disclosed.

22 Claims, 5 Drawing Sheets

100

200

SYSTEM FOR IDENTIFYING MEDIA CONTENT

FIELD OF THE DISCLOSURE

The present disclosure relates generally to media content and more specifically to a system for identifying media content.

BACKGROUND

Media content processors such as Set-Top Boxes (STBs) generally feature a combination of various vertical services (e.g., TV, DVR, Video on Demand, Music on Demand, Photos, etc.). These services tend to be presented in silos, with little opportunity for the user to smoothly transition from an item of content in one vertical service to a related item of content in another without backing completely out of the current silo and browsing into another.

DETAILED DESCRIPTION

In one embodiment of the present disclosure, a computer-readable storage medium can have computer instructions for detecting a selection of media content, presenting at a media device the selected media content, retrieving metadata associated with the selected media content, comparing the retrieved metadata with metadata of a plurality of media content sources, detecting one or more matches between the retrieved metadata and metadata of the plurality of media content sources, and presenting at the media device one or more sources of media content associated with the one or more matches of metadata.

In one embodiment of the present disclosure, a media content processor can have a controller element to compare a first portion of metadata associated with media content under presentation with a second portion of metadata of each of one or more media content sources to present one or more alternative sources of related media content.

In one embodiment of the present disclosure, a method can involve identifying one or more alternative sources of media content according to one or more matches between a portion of metadata associated with media content requested for presentation and a portion of metadata associated with one or more media content sources.

In one embodiment of the present disclosure, a computer-readable storage medium in a portal can have computer instructions for establishing communications with a media content processor, submitting to the media content processor a request for presentation of media content, presenting the requested media content responsive to receiving said requested media content from the media content processor, and presenting one or more alternative sources of related media content identified from a comparison of metadata of the requested media content and metadata of one or more media content sources.

Figure 1:
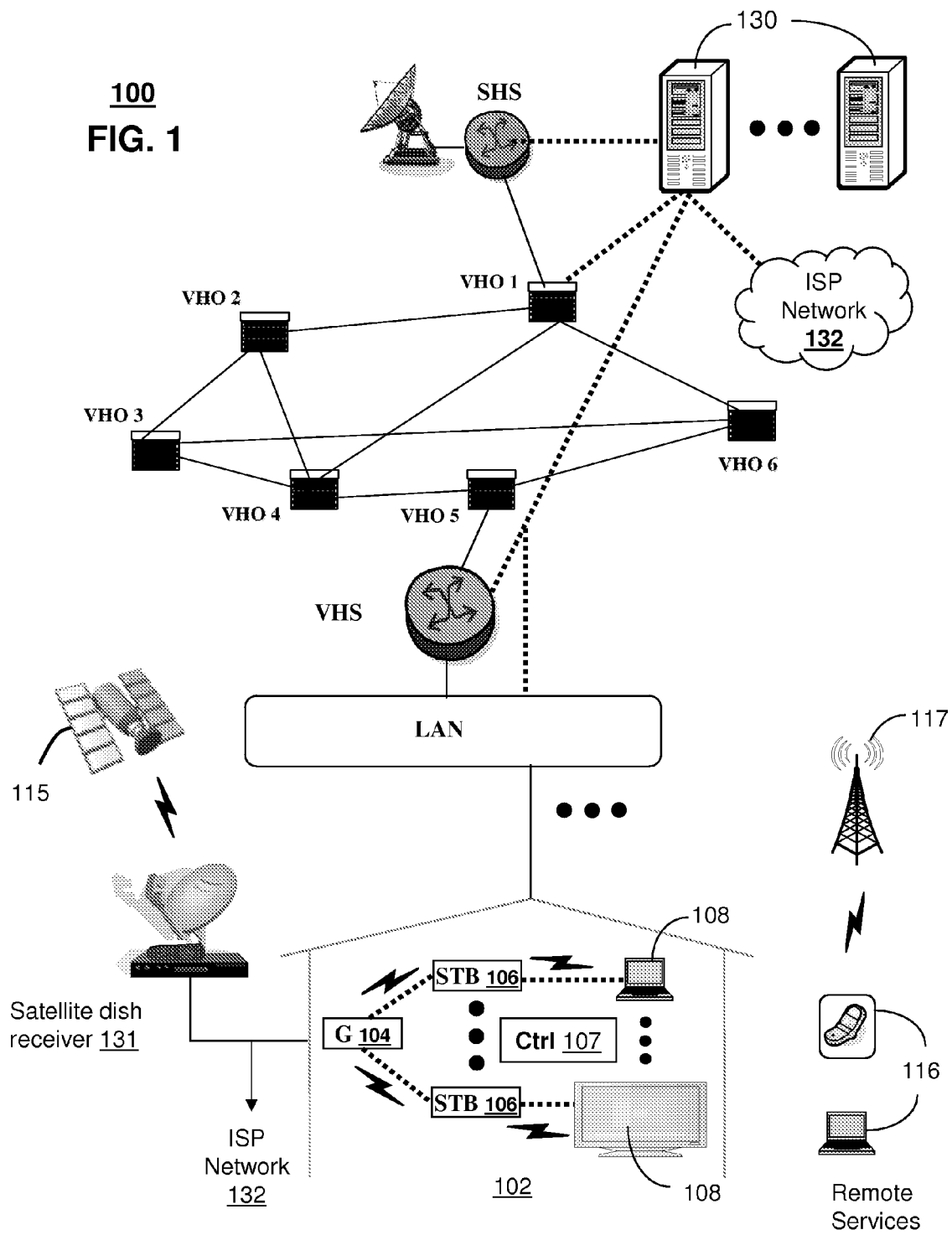
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and/or combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 that can operate as a web or Internet server for providing portal services over an Internet Service Provider (ISP) network 132 to fixed media devices 108 or portable communication devices 116 by way of a wireless base station 117 such as in a cellular communication network operating with common protocols (GSM, CDMA, etc.).

A satellite broadcast system can be used in place of the IPTV media system. In this embodiment, signals transmitted by a satellite 115 can be intercepted by a satellite dish receiver 131 coupled to building 102 which conveys media signals to the media content processors 106 by way of gateway 104. The media content processors 106 can be equipped with a broadband port to the ISP network 132. Although not shown, the communication system 100 can also be combined or replaced with analog or digital broadcast distributions systems such as cable systems. It would be apparent therefore to one of ordinary skill in the art that the present disclosure can be applied to any media content system.

Figure 2:
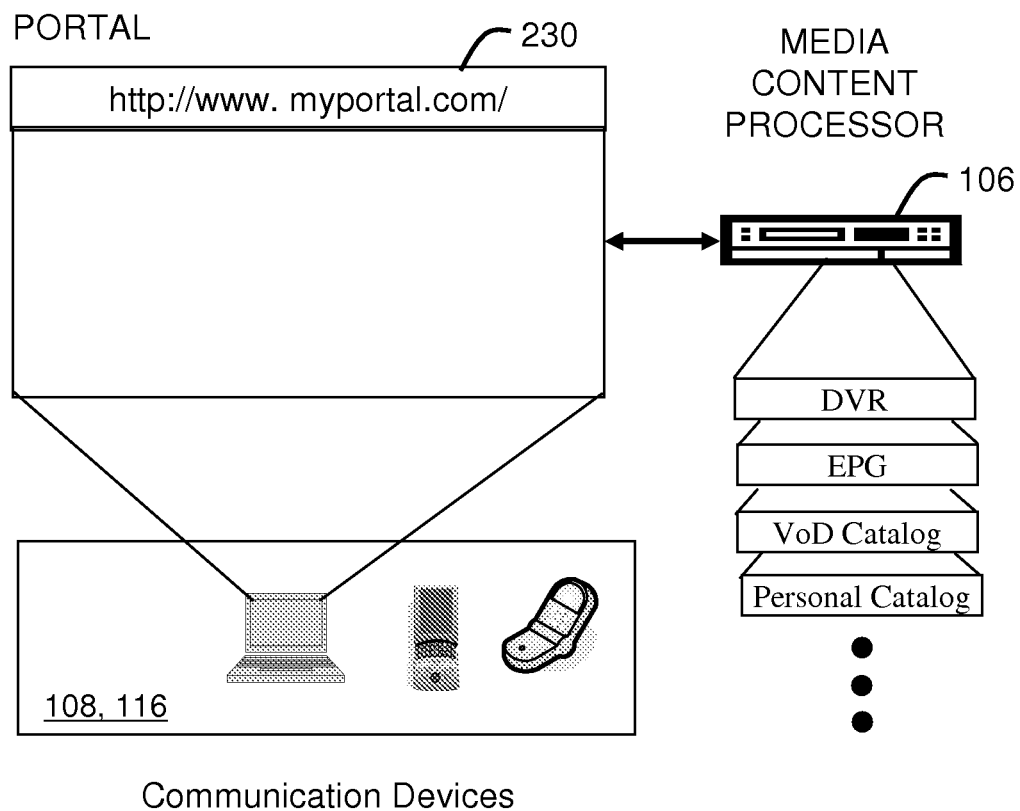
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
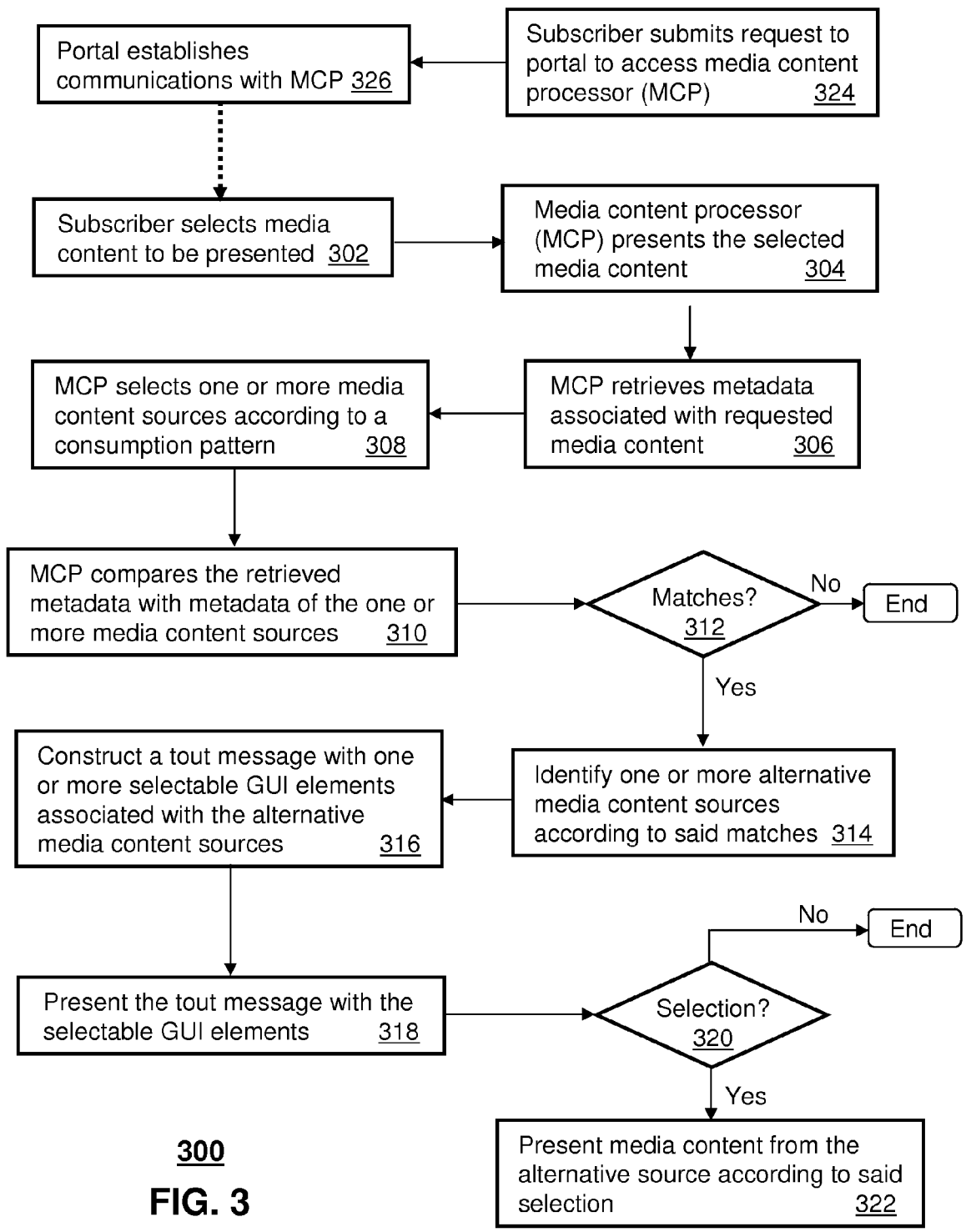
FIG. 3 depicts an exemplary method operating in portions of the communication system.

FIG. 3 depicts an exemplary method 300 operating in portions of the communication system 100. Method 300 begins with step 302 in which a subscriber of the media content processor 106 selects media content. This step can be accomplished several ways. When the subscriber is situated in building 102 the selection process can take place via the media controller 107. The media controller 107 can be used to select media content of a select media channel. Alternatively, the media controller 107 can be used to select media content of a DVR recording, or some other stored media file. In another embodiment, the subscriber can remotely log into portal 230 by way of a browser operated by a portable communication device 116 and request in step 324 remote access to the media content processor 106. The portal 230 can utilize common means in step 326 to establish communications over the ISP network 132 with the media content processor 106 via the gateway 104. Once communications have been established, the subscriber can select media content in a similar way as described in the previous embodiment by way of a graphical user interface (GUI) presented by the portal 230.

In step 304 the select media content is presented by the media content processor 106. In an embodiment where the subscriber is situation in building 102, the presentation can take place at a media device 108. In an embodiment where the subscriber logs into the portal 230 remotely with a portable communication device 116, the presentation of the media content can take place via a browser of said portable communication device 116 in the form of streamed data supplied by the media content processor 106. In the present context media content can represent audio content and/or video content. Media content can also represent still images with or without audio content. Audio only content can be music, documentaries, audio books, etc. Video content can be copyrighted content supplied by the IPTV communication system, downloaded from a VoD catalog, or personal videos stored in the media content processor 106, and so on. Still images can similarly be copyrighted content downloaded from a third party source, or a picture selected from a personal photo album of the subscriber.

In step 306 the media content processor 106 can retrieve metadata associated with the requested media content. Metadata can be text or binary information retrieved from a source such as an EPG, or a backend system of the IPTV communication system. The metadata can contain information about the media content such its genre, an identity of one or more artists (e.g., singers, actors), a title, a description of the media content (e.g., synopsis), and credits (e.g., producers, directors, etc.)—just to mention a few of the possible metadata options.

Once the metadata has been retrieved, the media content processor 106 can be programmed in step 308 to select one or more media content sources according to a consumption pattern of the subscriber. For example, a consumption pattern may indicate that the subscriber enjoys comedies and action movies, but not horror or drama movies. Similarly said consumption pattern may indicate that the subscriber has a particular likeness to towards classical and light rock music but not heavy medal or like genres. Consumption patterns can be determined by the media content processor 106 by observing media content consumed by the subscriber and applying common statistical techniques to identify such patterns.

From the consumption pattern, the media content processor 106 can identify media content sources likely to contain media content that may be of interest to the subscriber. The media content sources can be audio and/or video content databases. Additionally, said media content sources can correspond to for example a VoD catalog, an EPG, a repository of Digital Video Recorder (DVR) recordings stored in the media content processor 106, a repository of personal media content of the subscriber stored in the media content processor, and/or one or more media content sources accessible by way of the ISP network 132 (which may or may not be necessarily managed by a service provider of the IPTV communication system).

In step 310, the media content processor 106 can be programmed to compare the retrieved metadata of the media content selected in step 302 and metadata of the aforementioned one or more media content sources identified in step 308. Selective portions of the metadata can be compared in step 310. For example, the metadata retrieved in step 306 may indicate that the media content being presented is a drama episode of the TV program "24" recorded in a DVR feature of the media content process 106. The metadata can also indicate that Kiefer Sutherland is one of the primary actors in this program. The media content processor 106 can compare metadata such as this to metadata of the content sources selected in step 308 to find for example other media programs which Kiefer Sutherland has been a performer, a director or producer, as well as other episodes of "24".

If the media content processor 106 does not find any matches in step 312, method 300 ends and is repeated with respect to other media content selected by the subscriber on other occasions. If on the other hand one or more matches are found, the media content processor 106 proceeds to step 314 where it identifies one or more alternative media content sources associated with said matches (e.g., "Lost Boys" is available on VoD, Oprah has a scheduled interview with Kiefer Sutherland on XXX date on media channel ZZZ, etc.). For presentation purposes, the media content processor 106 can construct in step 316 a tout message that is presented in step 318 at the media device 108 or portable communication device 116 with one or more selectable GUI elements to manage presentation of media content supplied by said alternative sources.

Figure 4:
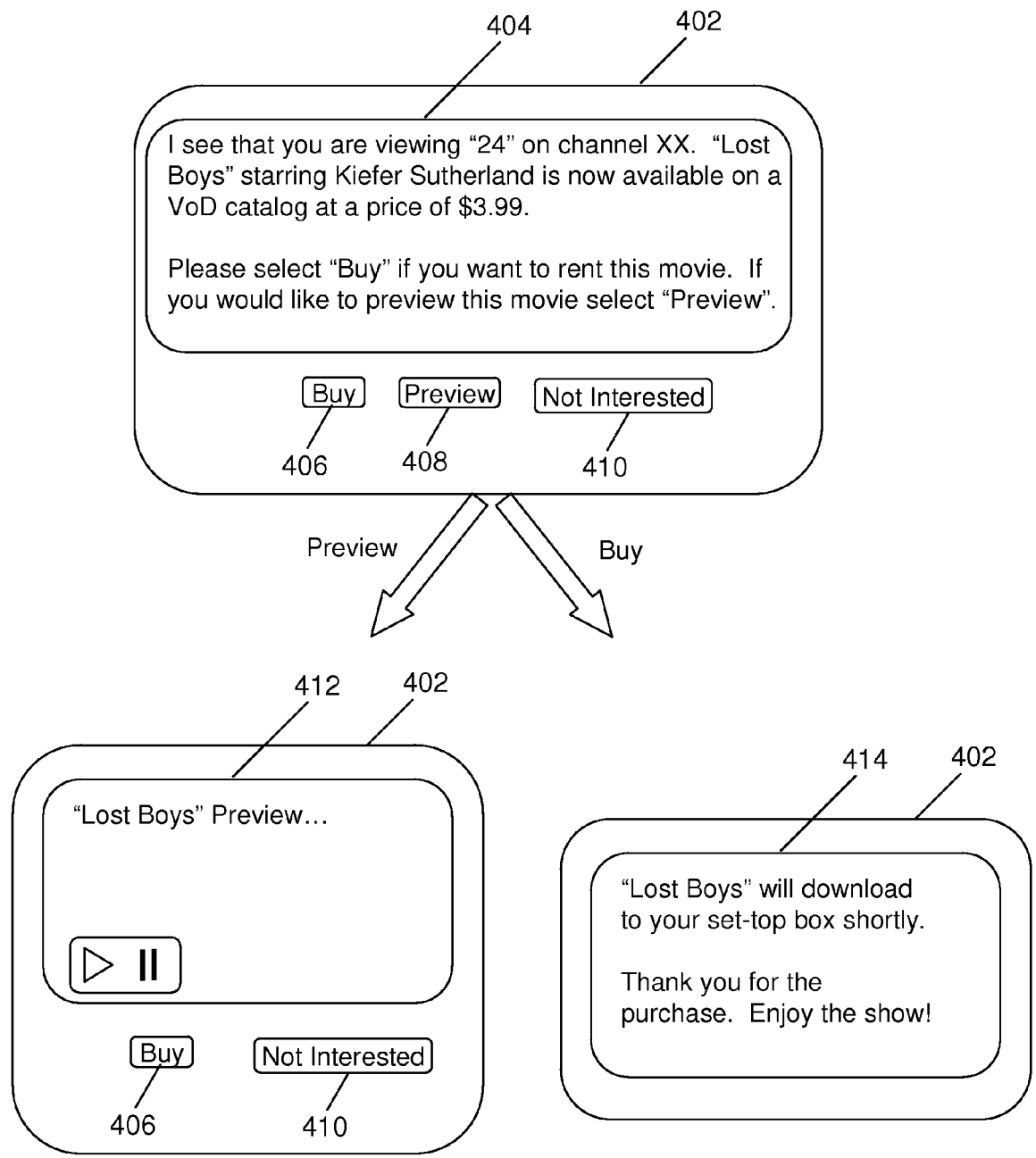
FIG. 4 depicts an exemplary embodiment of media content from an alternative media content source according to the method of FIG. 3.

FIG. 4 depicts embodiments of GUI window s 402 for presenting the tout message in step 318. In these embodiments, the GUI elements correspond to GUI buttons for responding to the tout message in GUI window 404. The GUI buttons can for example represent a command that can direct the media content processor 106 to perform a specific media presentation task associated with the alternative sources. As noted in this illustration, the tout message indicates that the movie "Lost Boys" starring Kiefer Sutherland is available on a VoD catalog of the IPTV communication system for a price of $3.99. The GUI buttons provide the subscriber the option to purchase (rent) the movie (Buy button 406), preview the movie (Preview button 408), and ignore the tout (Not Interested button 410).

When the preview button 408 is for example selected in step 320 a new GUI window 412 is presented in step 322 by way of a user interface of the media device 108 or portable communication device116. In said window 412 a trailer of the movie is presented at the media device 108 or streamed to the portable communication device 116 by way of the portal 230 to an embedded media player operating in a browser application of the portable communication device. GUI window 412 can have GUI elements such as play and pause buttons for controlling presentation of the movie trailer. The "Buy" GUI button 406 and the "Not Interested" GUI button 410 can be presented with the preview GUI window 412 in the event the subscriber wants to purchase or reject the media content being touted.

If the subscriber rejects the content, the media content processor 106 terminates the GUI window 402 thereby ending method 300 from step 320. If on the other hand the subscriber selects to purchase the media content in step 320 with or without previewing it, the media content processor 106 proceeds to step 322 where it presents GUI window 414 and begins to download from a VoD catalog or other source the media content item identified by the tout message. Once the download is complete, the media controller 107 can be used by the subscriber to playback the downloaded media content item. Alternatively, presentation of the downloaded media content can take place at the portable communication device 116 by way of the portal 230.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that the same media content sources are used in step 308 rather than a selection process based on consumption patterns. Additionally, method 300 can be applied in contexts other than the illustration given by FIG. 3. For instance, assume for example that the subscriber selects a media channel in step 302 to view an episode of the Star Trek series. Steps 310 through 322 can be used to suggest options to the subscriber for recording via the DVR other episodes of Star Trek found by way of the metadata comparison. Additionally, the media content processor 106 can keep track by way of the consumption patterns of the subscriber which Star Trek episodes have been previously consumed so that the tout message presented does not include previous viewings.

These are but a few examples of modifications that can be applied to the present disclosure without departing from the scope of the claims. Accordingly, the reader is directed to the claims section for a fuller understanding of the breadth and scope of the present disclosure.

Figure 5:
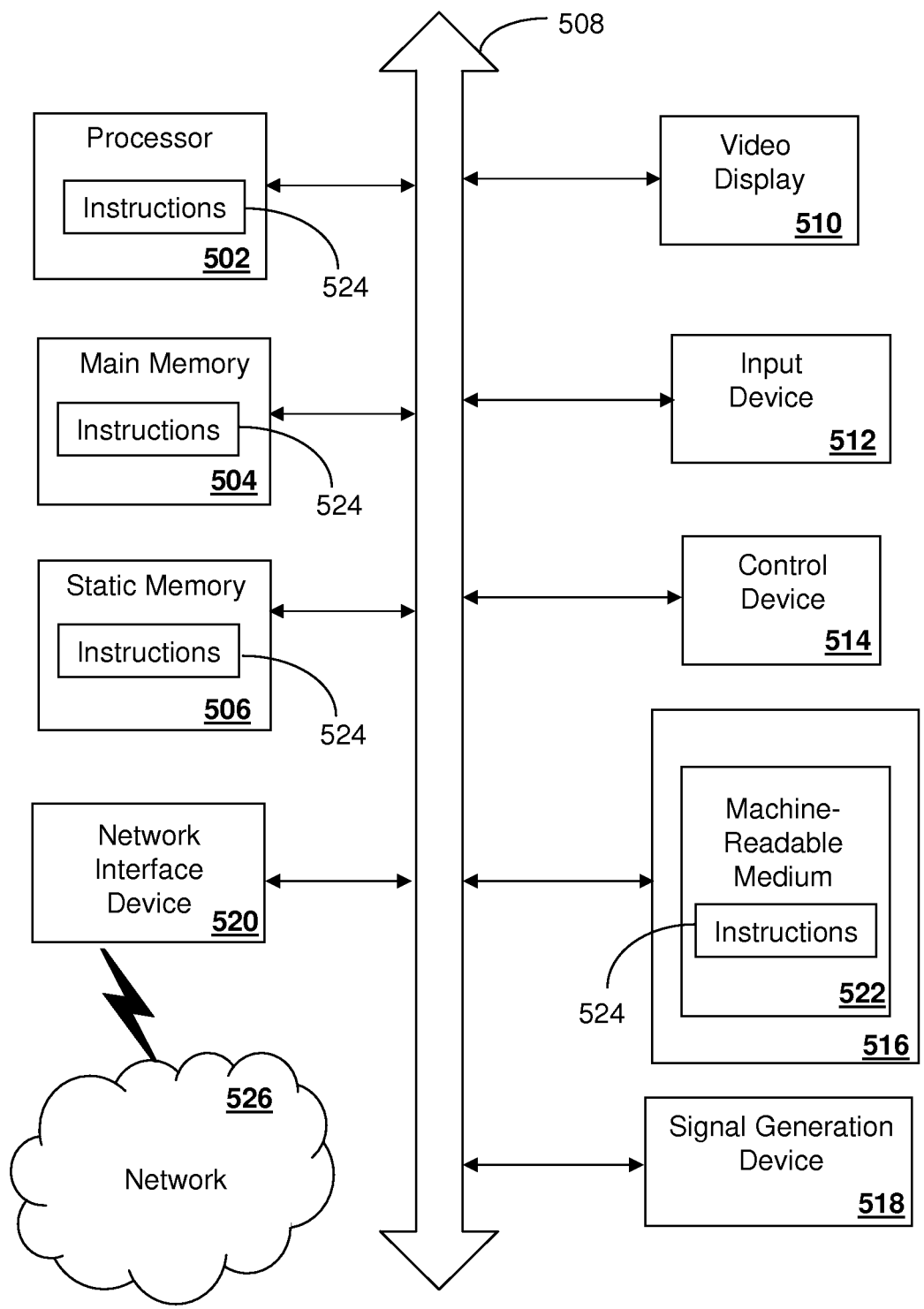
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions, which responsive to being executed by a processor, cause the processor to perform operations comprising:
   detecting a selection of media content associated with a media device of a user;
   presenting at the media device the media content;
   retrieving metadata associated with the media content during the presenting of the media content;
   determining a consumption pattern of media content associated with the media device of the user;
   identifying a plurality of identified alternative media content sources to contain alternative media content of interest based on the consumption pattern;
   comparing the metadata of the media content being presented at the media device with metadata of the plurality of identified alternative media content sources distinct from a content source that supplies the media content;
   in response to the comparing, indicating a match between the metadata of the media content being presented and the metadata of the plurality of identified alternative media content sources, presenting at the media device, during the presenting of the media content, a source of alternative media content associated with the match, wherein the source of alternative media content comprises media content stored in a repository of the media device;
   determining media content previously consumed by the media device of the user;
   constructing a tout message associated with the source of the alternative media content associated with the match and identifying the media content being presented at the media device;
   presenting at the media device the tout message, wherein the tout message does not include media content previously consumed by the media device of the user;
   constructing a selectable command in the tout message associated with the source of media content; and
   presenting, at the media device, the selectable command, wherein the selectable command is represented by a selectable graphical user interface element, and wherein one of the media content and the source of alternative media content associated with the match correspond to a television program.

2. The non-transitory machine-readable storage medium of claim 1, wherein the source of alternative media content source associated with the match comprises a repository of personal digital video recorder recordings.

3. The non-transitory machine-readable storage medium of claim 1, wherein the selected media content corresponds to audio content.

4. The non-transitory machine-readable storage medium of claim 1, wherein one of the metadata or the metadata of the plurality of identified alternative media content sources comprises information selected from a group consisting of a genre, an identity of an artist, a title, a description of the media content in question, credits associated with the media content in question and combinations thereof.

5. The non-transitory machine-readable storage medium of claim 1,
   wherein the operations further comprise:
   detecting a selection associated with the selectable command; and
   presenting, at the media device, media content associated with the source of media content responsive to the selection.

6. The non-transitory machine-readable storage medium of claim 1, wherein the processor comprises a media content processor, and wherein the media device is selected from a group consisting of a television set, a computer, a personal digital assistant and a portable communication device.

7. The non-transitory machine-readable storage medium of claim 6, wherein the media content processor corresponds to a set-top box receiver, and wherein the set-top box receiver operates in a system selected from a group consisting of an Internet protocol television communication system, a satellite television communication system and a cable television communication system.

8. A media content processor, comprising:
   a memory to store executable instructions; and
   a controller element in communication with the memory, wherein the controller element, responsive to executing the instructions, performs operations comprising:
   determining a consumption pattern of media content associated with a media device of a user;
   identifying by the consumption pattern a plurality of identified alternative media content sources likely to contain media content of interest;

comparing a first portion of metadata associated with media content under presentation at the media device with a second portion of metadata of each identified alternative media content source of the plurality of identified alterantive media content sources;

determining from the plurality of identified alternative media content sources an alternative meida content source of related media content responsive to the comparing of the first and second portions of metadata, wherein the alternative media content source of related media content comprises media content stored in a repository of the media device;

presenting the alternative media content source of related media content, wherein the media content under presentation is supplied by a media content source other than the alternative source;

determining media content previously consumed by the media device of the user;

constructing a tout message associated with the alternative media content source and identifying the media content under presentation at the media device;

presenting at the media device the tout message, wherein the tout message does not include media content previously consumed by the media device of the user;

constructing a selectable command in the tout message associated with the alternative media content source; and presenting, at the media device, the selectable command, wherein the selectable command is represented by a selectable graphical user interface element, and wherein one of the media content under presentation at the media device and the alternative media content source correspond to personal media content.

9. The media content processor of claim 8, wherein the operations further comprise presenting the media content under presentation at the media device, and wherein the personal media content comprises personal video recordings.

10. The media content processor of claim 9, wherein determining the alternative source of related media content comprise:

detecting a match between the first and second portions of metadata; and identifying the alternative source of related media content based on the match.

11. The media content processor of claim 8, wherein the media content source is selected from a group consisting of a video on demand catalog, an electronic programming guide, a repository of digital video recorder recordings, a repository of media content and a media content source accessible by way of an Internet service provider, and wherein the media content corresponds to video content.

12. The media content processor of claim 8, wherein the first portion of metadata comprises information selected from a group consisting of a genre, an identity of an author, a title, a description of media content in question and credits associated with the media content in question, and wherein the media content processor operates in a system selected from a group consisting of an Internet protocol television communication system, a satellite television communication system and a cable television communication system.

13. The media content processor of claim 8, wherein the operations further comprise:

constructing a selectable graphical user interface element in a tout message associated with the alternative source of related media content; and presenting at the media device the tout message with the selectable graphical user interface element.

14. The media content processor of claim 13, wherein the operations further comprise:

detecting a selection from the graphical user interface element; and presenting at the media device the alternative source of related media content responsive to the selection.

15. The media content processor of claim 8, wherein the determining of the consumption pattern comprises associating with the media device of the user a plurality of requests to present media content at the media device of the user, and wherein the identifying of the plurality of identified alterantive media content sources comprises selecting the plurality of identified alternative media content sources according to the consumption pattern.

16. A method, comprising:

determining, by a system comprising a processor, a consumption pattern of media content associated with a media device of a user;

identifying, by the system, by way of the consumption pattern, a plurality of identified media content sources likely to contain media content of interest;

determining, by the system, a match between a first portion of metadata associated with media content requested for presentation at the media device of the user and a second portion of metadata associated with an identified media content source of the plurality of identified media content sources;

identifying, by the system, an alternative source of media content according to the determining of the match between the first portion of metadata and the second portion of metadata, wherein the media content requested for presentation is supplied by a media content source other than the alternative source, and wherein the media content source other than the alternative source comprises media content stored in a repository of the media device;

determining, by the system, media content previously consumed by the media device of the user;

constructing, by the system, a tout message associated with the alternative source of media contnet and identifying the media content under presentation at the media device;

presenting, by the system, at the media device the tout message, wherein the tout message does not include media content previously consumed by the media device;

constructing, by the system, a selectable command in the tout message assocaited with the alternative source of the media content; and presenting, at the media device, the selectable command, wherein the selectable command is represented by a selectable graphical user interface element, and wherein one of the media content under presentation at the media device and the alternative source of the media content correspond to personal media content.

17. The method of claim 16, wherein the media content source is selected from a group consisting of a repository of personal digital video recorder recordings, a repository of personal photos.

18. The method of claim 16, wherein the first portion of the metadata comprises information selected from a group consisting of a genre, an identity of an author, a title, a description of media content in question and credits associated with the media content in question, and wherein a portion of the media content is supplied by a system selected from a group consisting of an Internet protocol television communication system, a satellite television communication system and a cable television communication system.

19. The method of claim 16, comprising excluding, by the system, a portion of the match according to the consumption pattern of media content.

20. A non-transitory machine-readable storage medium to operate in a portal, comprising executable instructions, which responsive to being executed by a processor, cause the processor to perform operations comprising:
- establishing communications with a media content processor of a user;
- submitting to the media content processor a request for presentation of media content;
- presenting the media content responsive to receiving the media content from the media content processor;
- determining a consumption pattern of media content associated with the media content processor;
- identifying by the consumption pattern a plurality of alternative media content sources likely to contain alternative media content of interest;
- comparing metadata of the media content and metadata of alternative media content of each alterantive media content source of the plurality of alternative media content sources likely to contain the alternative media content of interest;
- presenting an alternative source of related media content identified responsive to the comparing of the metadata of the media content and metadata of each alternative media content source of the plurality of alternative media content sources, wherein the media content is supplied by a source other than the alternative source, and wherein the media content source other than the alternative source comprises media content stored in a repository of the media content processor;
- determining media content previously consumed by the media contnet processor of the user;
- constructing a tout message associated with the alternative source of related media content and identifying the media content under presentation at the media content processor;
- presenting at the media content processor the tout message, wherein the tout message does not include media content previously consumed by the media content processor;
- constructing a selectable command in the tout message associated with the alternative media content source; and
- presenting, at the media content processor, the selectable command, wherein the selectable command is represented by a selectable graphical user interface element, and wherein one of the media content under presentation at the media content processor and the alternative media content source correspond to personal media content.

21. The non-transitory machine-readable storage medium of claim 20, wherein the media content is streamed from the media content processor.

22. The non-transitory machine-readable storage medium of claim 20, wherein the metadata of the media content comprises information selected from a group consisting of a genre, an identity of an author, a title, a description of media content in question and credits associated with the media content in question, and wherein the comparing of the metadata of the media content is performed by the media content processor.

* * * * *